(12) United States Patent
Satou

(10) Patent No.: US 7,806,332 B2
(45) Date of Patent: Oct. 5, 2010

(54) PASSIVE TYPE RFID SEMICONDUCTOR DEVICE, IC TAG, AND CONTROL METHOD

(75) Inventor: Koutarou Satou, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 257 days.

(21) Appl. No.: 11/349,268

(22) Filed: Feb. 8, 2006

(65) Prior Publication Data
US 2006/0175420 A1    Aug. 10, 2006

(30) Foreign Application Priority Data
Feb. 9, 2005    (JP) .............................. 2005-032910

(51) Int. Cl.
H04Q 5/22    (2006.01)
G08B 13/14    (2006.01)
G06K 7/00    (2006.01)
G06K 19/00    (2006.01)

(52) U.S. Cl. ...................... 235/435; 235/487; 340/10.1; 340/10.34; 340/10.51; 340/572.1

(58) Field of Classification Search ................. 235/435, 235/487; 340/10.1, 10.33, 10.34, 10.5, 10.51, 340/572.1
See application file for complete search history.

(56) References Cited

U.S. PATENT DOCUMENTS

| | | | | |
|---|---|---|---|---|
| 5,517,194 A | * | 5/1996 | Carroll et al. ............ | 340/10.34 |
| 5,521,590 A | | 5/1996 | Hanaoka et al. | |
| 5,945,920 A | * | 8/1999 | Maletsky ................. | 340/10.52 |
| 6,046,676 A | * | 4/2000 | Ward et al. ............... | 340/572.1 |
| 6,070,804 A | * | 6/2000 | Miyamoto ................. | 235/494 |
| 6,369,712 B2 | * | 4/2002 | Letkomiller et al. ..... | 340/572.1 |
| 6,412,086 B1 | * | 6/2002 | Friedman et al. ........... | 714/733 |
| 6,515,919 B1 | * | 2/2003 | Lee ............................ | 365/192 |

(Continued)

FOREIGN PATENT DOCUMENTS

JP    8-94743    4/1996

(Continued)

OTHER PUBLICATIONS

"Fully Integrated Passive UHF RFID Transponder IC With 16.7-μW Minimum RF Input Power" in IEEE Journal of Solid Waste Circuits, vol. 38, No. 10, Oct. 2003, pp. 1602-1608.

(Continued)

*Primary Examiner*—Daniel Walsh
(74) *Attorney, Agent, or Firm*—McGinn IP Law Group, PLLC

(57) ABSTRACT

To provide a semiconductor device capable of securely executing a reading operation to improve a reliability of read data, an IC tag including the semiconductor device, and a control method for the IC tag. A semiconductor device according to an embodiment of the present invention includes: a power supply voltage generating circuit for generating a power supply voltage based on a received radio signal; a power supply voltage generating circuit for detecting the power supply voltage; a memory area for storing predetermined data; a reading/writing circuit using different operation voltages for reading data from the memory area and writing data to the memory area; and a control circuit for executing a data reading operation for the memory area based on a detected power supply voltage.

24 Claims, 13 Drawing Sheets

U.S. PATENT DOCUMENTS

| | | | | |
|---|---|---|---|---|
| 6,809,952 | B2* | 10/2004 | Masui | 365/145 |
| 6,938,822 | B2* | 9/2005 | Komatsu | 235/437 |
| 7,260,371 | B1* | 8/2007 | Yones | 455/186.1 |
| 7,583,180 | B2 | 9/2009 | Sato | |
| 7,599,233 | B2* | 10/2009 | Kang | 365/192 |
| 2001/0004236 | A1* | 6/2001 | Letkomiller et al. | 340/572.1 |
| 2003/0121985 | A1* | 7/2003 | Baldischweiler et al. | 235/492 |
| 2004/0065733 | A1* | 4/2004 | Fukuoka | 235/435 |
| 2005/0030201 | A1* | 2/2005 | Bridgelall | 340/870.11 |
| 2005/0052279 | A1* | 3/2005 | Bridgelall | 340/10.1 |
| 2005/0141256 | A1* | 6/2005 | Yamazaki et al. | 365/96 |
| 2005/0274799 | A1* | 12/2005 | Torchalski et al. | 235/432 |
| 2005/0282505 | A1* | 12/2005 | Umeda et al. | 455/100 |
| 2006/0001525 | A1* | 1/2006 | Nitzan et al. | 340/10.1 |
| 2006/0007771 | A1* | 1/2006 | Sato | 365/226 |
| 2006/0175420 | A1* | 8/2006 | Satou | 235/492 |
| 2006/0185781 | A1* | 8/2006 | McLaughlin | 156/64 |
| 2006/0186999 | A1* | 8/2006 | McLaughlin | 340/10.51 |
| 2006/0276206 | A1* | 12/2006 | Shiotsu et al. | 455/462 |
| 2007/0013486 | A1* | 1/2007 | Yeoh et al. | 340/10.34 |
| 2007/0018793 | A1* | 1/2007 | Stewart et al. | 340/10.3 |
| 2007/0024426 | A1* | 2/2007 | Akiyama et al. | 340/10.5 |
| 2007/0132557 | A1* | 6/2007 | Kang et al. | 340/10.34 |
| 2007/0229271 | A1* | 10/2007 | Shionoiri et al. | 340/572.1 |
| 2007/0285246 | A1* | 12/2007 | Koyama | 340/572.1 |
| 2008/0018476 | A1* | 1/2008 | Grasset | 340/572.7 |
| 2008/0036605 | A1* | 2/2008 | Pillai | 340/572.7 |
| 2008/0042803 | A1* | 2/2008 | Posamentier | 340/10.1 |
| 2008/0048863 | A1* | 2/2008 | Copeland | 340/572.1 |
| 2008/0093935 | A1* | 4/2008 | Saito et al. | 307/149 |
| 2008/0136603 | A1* | 6/2008 | Choi et al. | 340/10.33 |
| 2008/0204333 | A1* | 8/2008 | Lamothe | 343/703 |
| 2008/0211638 | A1* | 9/2008 | Masui et al. | 340/10.51 |
| 2008/0224833 | A1* | 9/2008 | Aikawa et al. | 340/10.51 |
| 2008/0259665 | A1* | 10/2008 | Brederlow et al. | 363/127 |
| 2010/0039267 | A1* | 2/2010 | Wall et al. | 340/572.5 |

FOREIGN PATENT DOCUMENTS

| | | |
|---|---|---|
| JP | 11-66248 | 3/1999 |

OTHER PUBLICATIONS

Udo Karthaus et al., "Fully Integrated Passive UHF RFIDD Transponder IC With 16.7uW Minimum RF Input Power", IEEE Journal of Solid-State Circuits, vol. 38, No. 10, Oct. 2003, pp. 1602-1608. (previously cited).

Japanese Office Action dated Dec. 2, 2008 with English translation thereof.

* cited by examiner

RELATED ART

| OPERATION<br>POWER SUPPLY VOLTAGE | LOGIC CIRCUIT OPERATION | NONVOLATILE MEMORY READING OPERATION | IC TAG READING OPERATION |
|---|---|---|---|
| LOWER THAN LOGIC CIRCUIT OPERATION MARGINAL VOLTAGE VALUE | × | × | × |
| LOGIC CIRCUIT OPERATION MARGINAL VOLTAGE VALUE ~ MEMORY READ CIRCUIT OPERATION MARGINAL VOLTAGE VALUE | ○ | × | △ |
| HIGHER THAN MEMORY READ CIRCUIT OPERATION MARGINAL VOLTAGE VALUE | ○ | ○ | ○ |

Fig. 13

PASSIVE TYPE RFID SEMICONDUCTOR DEVICE, IC TAG, AND CONTROL METHOD

BACKGROUND OF THE INVENTION

1. Field of the Invention

The present invention relates to a passive type RFID semiconductor device, an IC tag, and a control method. In particular, the present invention relates to a semiconductor device for generating a power supply voltage based on a received radio signal, an IC tag including the semiconductor device, and a control method for the IC tag.

2. Description of Related Art

In recent years, attentions have been paid to a technique regarding RFID (Radio Frequency IDentification) as a product automatic identifying technique for affixing an IC tag having product specific information written thereto, and scanning this information using a radio antenna to manage a product in real time, in merchandise logistics management at the factory and article management at a retail shop.

The above RFID IC tag (hereinafter simply referred to as "IC tag") does not incorporate a battery since a power supply voltage is generated based on radio waves at the time of communicating data with a reader/writer by radio waves. Such an IC tag is a so-called "passive type", and an internal circuit of the IC tag rectifies (shapes) a part of a carrier from the reader/writer to generate a power supply voltage necessary for the operation. The generated power supply voltage allows plural circuits in the semiconductor device of the IC tag to operate. The circuits include a logic circuit controlling the IC tag, a nonvolatile memory where product specific information is written, and a communication circuit necessary for data communication with a reader/writer.

FIG. 11 is a block diagram of a conventional passive-type IC tag that is denoted by 101. As shown in FIG. 11, the conventional IC tag 101 includes a power supply voltage generating circuit 111, a receiving circuit 112, a transmitting circuit 113, a control circuit 113, a charge-pump circuit 115, a nonvolatile memory 116, and an antenna 120.

An operation of the conventional IC tag 101 of FIG. 11 is described. A reader/writer (not shown) propagates radio waves including a frame pulse wave (pulse wave of a predetermined frequency) that can be recognized by the IC tag 101 in a given range thereof. When the IC tag 101 is situated in the range where the radio waves including the frame pulse wave can be recognized, the IC tag 101 receives the radio waves via the antenna 120. After receiving the radio waves, the IC tag 101 rectifies the received radio waves in the power supply voltage generating circuit 111 to generate a power supply voltage necessary for internal circuits of the IC tag 101 to operate. Further, a clock signal necessary for the internal circuits of the IC tag 101 to operate is generated based on a frequency of the pulse wave in the radio waves and in addition, the internal circuits are initialized in preparation for reception of a write or read command sent from the reader/writer.

When the IC tag 101 receives radio waves carrying a command and data sent from the reader/writer, the receiving circuit 112 demodulates signals of the command and data on the received radio waves. The control circuit 113 receives the decoded command and data to execute a processing designated by the command. For example, as regards a read command, the control circuit 113 reads data from a designated address of the nonvolatile memory 116 to send the read data to the transmitting circuit 113. The transmitting circuit 113 modulates the received data and then superimposes the data on a carrier and transmits the data from the antenna 120. As regards a write command, the received data is written to a designated address of the nonvolatile memory 116. In general, a high voltage of 14 V to 16 V is necessary for writing data to the nonvolatile memory 116. Therefore, as a voltage for writing data to the nonvolatile memory 116, a voltage obtained by boosting a power supply voltage generated by the power supply voltage generating circuit 111 by means of the charge-pump circuit 115 is used.

For example, a technique of generating a power supply voltage using radio waves received by the antenna 120 for operating the control circuit 113, the charge-pump circuit 115, and the nonvolatile memory 116 and writing received data to the nonvolatile memory 116 by radio is disclosed by Udo Karthaus et al. in "Fully Integrated Passive UHF RFID Transponder IC With 16.7-$\mu$W Minimum RF Input Power" in IEEE JOURNAL OF SOLID STATE CIRCUITS, VOL. 38, NO. 10, October, 2003, pp. 1602-1608.

When the reader/writer reads data from the nonvolatile memory 116 in the IC tag 101 in response to a read command, it is generally determined whether or not the data is normally read, based on whether or not the IC tag 101 sends back a response. If receiving the read data in accordance with the read command, the reader/writer determines that data was normally read. If the read data cannot be received after the elapse of a predetermined period, the reader/writer determines that data was not normally read.

The control circuit 113 for controlling operations of reading/writing data from/to the nonvolatile memory 116 and the transmitting circuit 113 for transmitting the read data normally operate if a power supply voltage generated by the power supply voltage generating circuit 111 is equal to or higher than the lowest possible voltage value at which a logic circuit can operate (limit voltage value for operating the logic circuit, referred to as "logic circuit operation marginal voltage value") However, a power supply voltage should be equal to or higher than the lowest possible voltage value at which a reading circuit in the nonvolatile memory 116 can operate (limit voltage value for operating a memory read circuit, referred to as "memory read circuit operation marginal voltage value"), for normally reading data from the nonvolatile memory 116.

Prior to the explanation about the memory read circuit operation marginal voltage value, the structure of the nonvolatile memory is first described. FIG. 12 shows a typical structural example of the nonvolatile memory. The nonvolatile memory of FIG. 12 is an EEPROM that stores data by applying hot electrons to a floating gate of each memory cell. As shown in FIG. 12, this nonvolatile memory includes a memory cell array 210 for storing data, a row decoder 220 for decoding a row address, a column decoder 230 for decoding a column address, and a data input/output circuit 240 for inputting/outputting read data or written data.

In the memory cell array 210, plural memory cells 211 are arranged in a row direction (horizontal direction) and a column direction (vertical direction). The memory cells 211 are floating gate type cells for storing data by controlling electrons in the floating gate. In the memory cell array 210, plural word lines 212 extend in the row direction, and bit lines 213 extend in the column direction. The memory cells 211 are arranged at intersections between the plural word lines 212 and the plural bit lines 213. Each of the memory cells 211 has a control gate connected with a corresponding word line 212, a drain connected with a corresponding bit line 213, and a grounded source.

In the case of writing data to the memory cells 211, for example, a row address is input to the row decoder 220 to select a corresponding one of the word lines 212. A column address is input to the column decoder 230 to select a corresponding one of the bit lines 213 and select a memory cell corresponding to the desired address from among the memory cells 211. Then, a writing voltage is applied to the selected word line 212 and bit line 213. The reading voltage is a high voltage boosted by the charge-pump circuit 115. By applying such a high voltage, a charge amount of a floating gate of the selected memory cell 211 is changed to write data to the memory cell 211.

In the case of reading data from the memory cells 211, similar to the writing operation, a memory cell corresponding to a desired address is selected from among the memory cells 211. Then, the selected word line 212 applies a reading voltage to a control gate of the memory cell 211, and the selected bit line 213 applies a reading voltage to a drain of the memory cell 211. The reading voltage is lower than the writing voltage, in other words, the reading voltage is not boosted by the charge-pump circuit 115. Hence, a threshold voltage varies depending on charges in the floating gate of the memory cell 211 (stored data), so data is read based on whether or not current flows between a drain and source. For example, in the case where a threshold voltage is increased in accordance with the data writing operation, a memory cell is out of conduction, which suggests that the data is being written.

Circuits such as the row decoder 220 or the column decoder memory cells 211 are composed of inverters 221 and 231 and other such transistors. Output terminals of the inverters 221 and 231 are connected with the word line 212 and the bit line 213. The transistors such as the inverters 221 and 231 receives high voltage upon the writing operation as mentioned above and are thus high-breakdown-voltage transistors. In general, a threshold value of the high-breakdown-voltage transistor is higher than that of any general transistor. That is, a power supply voltage necessary for operating the high-breakdown-voltage transistor is higher than that of any general transistor. For example, as for a circuit requiring a writing voltage of 15 V, a threshold value is about 1.5 V.

Therefore, in the case of writing data to the nonvolatile memory 116, a boosted voltage, i.e., a high voltage is necessary. In the case of reading data from the nonvolatile memory 116, a voltage that allows the high-breakdown-voltage transistor such as the row decoder 220 to operate is necessary. The minimum value of a reading operation voltage is the memory read circuit operation marginal voltage value.

FIG. 13 shows a relation between a power supply voltage that is generated using radio waves, and a logic circuit operation and the nonvolatile memory reading operation and the IC tag reading operation by the reader/writer.

If the generated power supply voltage is below the logic circuit operation marginal voltage value, data is normally read from neither the logic circuit nor the nonvolatile memory. That is, the control circuit for controlling the reading operation cannot operate in response to a read command from the reader/writer, so the IC tag cannot respond to the command from the reader/writer. Accordingly, the reader/writer fails to read data from the IC tag (in this case, the IC tag reading operation of the IC tag is denoted by a cross mark "x").

If the generated power supply voltage is between the logic circuit operation marginal voltage value to memory read circuit operation marginal voltage value, the logic circuit can operate but data cannot be normally read from the nonvolatile memory. That is, the IC tag can operate in accordance with the read command from the reader/writer, but data is not normally read from the nonvolatile memory, with the result that wrong data is read and the read data is sent to the reader/writer. Therefore, although the reading operation for the IC tag ends in failure, the IC tag reading operation of the reader/writer appears to normally end (in this case, the IC tag reading operation of the reader/writer is designated by a triangle mark "▲".

Further, if the generated power supply voltage is the memory read circuit operation marginal voltage value or higher, data can be normally read from both the logic circuit and the nonvolatile memory. That is, data is normally read from the nonvolatile memory in response to a read command from the reader/writer, so correct data is read in response to the read command. Accordingly, the reader/writer succeeds in reading data from the IC tag (in this case, the IC tag reading operation of the reader/writer is designated by a circle mark "○").

As mentioned above, in the IC tag, if the generated power supply voltage ranges from the logic circuit operation marginal voltage value to the memory read circuit operation marginal voltage value, although a normal reading operation is not executed in response to a read command from the reader/writer, the reader/writer determines that the IC tag reading operation normally ends.

That is, the power supply voltage generated by the IC tag ranges from the logic circuit operation marginal voltage value to the memory read circuit operation marginal voltage value, a reading circuit for the nonvolatile memory in the IC tag does not normally operate, but the logic circuit normally operates, so the IC tag responds to the read command. Thus, the reader/writer mistakes the wrong data for correct data.

Hence, there is a possibility that the data read from the IC tag is wrong, which reduces a reliability of the read data. If the data read from the IC tag is wrong, an erroneous operation is executed.

SUMMARY OF THE INVENTION

A passive type RFID semiconductor device according to an aspect of the invention includes: a power supply voltage generating unit for generating a power supply voltage based on a received radio signal; a voltage detecting unit for detecting the generated power supply voltage; a storage unit for storing predetermined data; a reading/writing unit using different operation voltages for reading data from the storage unit and writing data to the storage unit; and a control unit for executing a data reading operation for the storage unit based on the power supply voltage detected by the voltage detecting unit.

According to the semiconductor device, the data reading operation is executed based on the power supply voltage, and if the power supply voltage reaches a value at which the data reading operation can be performed, the reading operation can be executed. Hence, the reading operation can be reliably performed to improve a reliability of read data.

An IC tag according to another aspect of the invention includes: an antenna for transmitting/receiving radio waves to/from a reader/writer; and a semiconductor device connected with the antenna and including: a power supply voltage generating unit for generating a power supply voltage based on a received radio signal; a voltage detecting unit for detecting the generated power supply voltage; a storage unit for storing predetermined data; a reading/writing unit using different operation voltages for reading data from the storage unit and writing data to the storage unit; and a control unit for executing a data reading operation for the storage unit based on the power supply voltage detected by the voltage detecting unit.

According to the IC tag, the data reading operation is executed based on the power supply voltage, and if the power supply voltage reaches a value at which the data reading operation can be performed, the reading operation can be executed. Hence, the reading operation can be reliably performed to improve a reliability of read data.

According to still another aspect of the invention, a control method for controlling a reading operation for an IC tag including a storage unit for storing predetermined data, and a reading/writing unit using different operation voltages for reading data from the storage unit and writing data to the storage unit, includes processings executed in the IC tag, the processings including: generating a power supply voltage based on a radio signal received from a reader/writer; detecting the generated power supply voltage; and executing a data reading operation for the storage unit based on the detected power supply voltage.

According to the control method, the data reading operation is executed based on the power supply voltage, and if the power supply voltage reaches a value at which the data reading operation can be performed, the reading operation can be executed. Hence, the reading operation can be reliably performed to improve a reliability of read data.

According to the present invention, it is possible to provide a semiconductor device capable of securely executing a reading operation to improve a reliability of read data, an IC tag including the semiconductor device, and a control method for the IC tag.

BRIEF DESCRIPTION OF THE DRAWINGS

The above and other objects, advantages and features of the present invention will be more apparent from the following description taken in conjunction with the accompanying drawings, in which:

FIG. 13 shows a relation between a power supply voltage and an operation of a conventional IC tag.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

To begin with, a communication system using an IC tag according to a first embodiment of the present invention is described. The IC tag and communication system according to this embodiment have a feature that a reading operation is executed if a power supply voltage generated by the IC tag is higher than a memory read circuit operation marginal voltage value.

Figure 1:
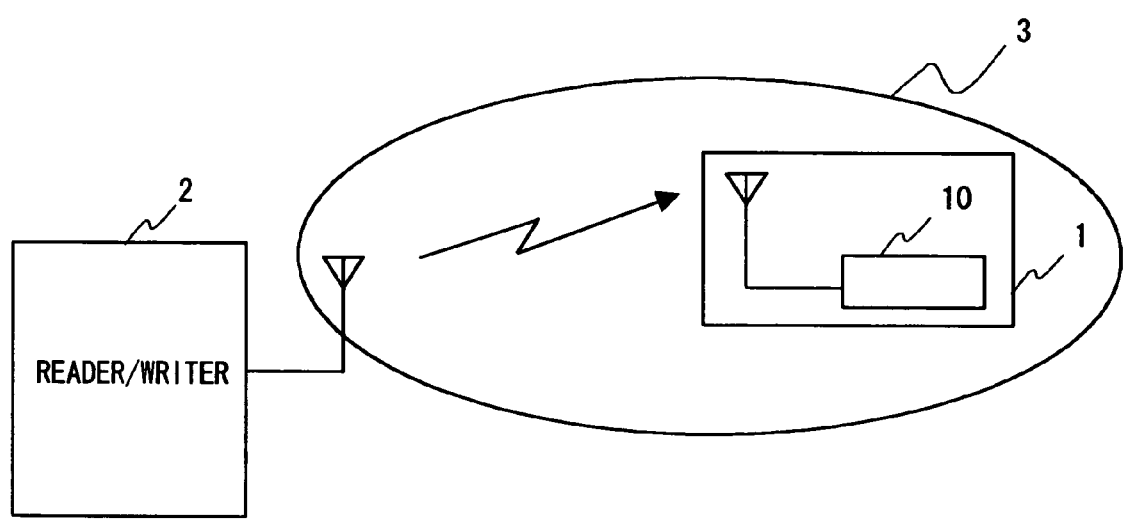
FIG. 1 shows the configuration of a communication system using an IC tag according to a first embodiment of the present invention.

Referring to FIG. 1, the configuration of the communication system using the IC tag of this embodiment is described. This communication system includes, as shown in FIG. 1, an IC tag 1 and a reader/writer 2. In the communication system, the IC tag 1 communicates with the reader/writer 2 by radio.

The reader/writer 2 is connected with a computer (not shown) in a communicable form, and functions to write desired data to a memory circuit in the IC tag 1 or read written data or a tag ID as an identifier of the IC tag 1 from the IC tag 1 in accordance with an instruction of the computer.

In the case of writing/reading data to/from the IC tag 1, for example, if the reader/writer 2 gets near the IC tag 1, the reader/writer 2 transmits radio waves to the IC tag 1. Then, the IC tag 1 rectifies the radio waves to generate a power supply voltage. Then, the reader/writer 2 sends the command from the computer to the IC tag 1. Receiving the command, the IC tag 1 reads/writes data from/to a memory circuit in the IC tag 1.

The IC tag 1 of this embodiment is, for example, a passive type (without built-in batteries), and thus needs to rectify the radio waves received from the reader/writer 2 inside the IC tag 1 (power supply voltage generating circuit 11 as mentioned later) to generate a power supply voltage. A level of a voltage generated by an internal circuit of the IC tag 1 generally depends on a distance between the reader/writer 2 and the IC tag 1. Hence, if it is desired that the IC tag 1 communicate with the reader/writer 2, the IC tag 1 should be situated within such a distance range that radio waves from the reader/writer 2 can be received to generate a power supply voltage that allows a semiconductor device 10 in the IC tag 1 to operate (within a communicable range 3 of FIG. 1).

Figure 2:
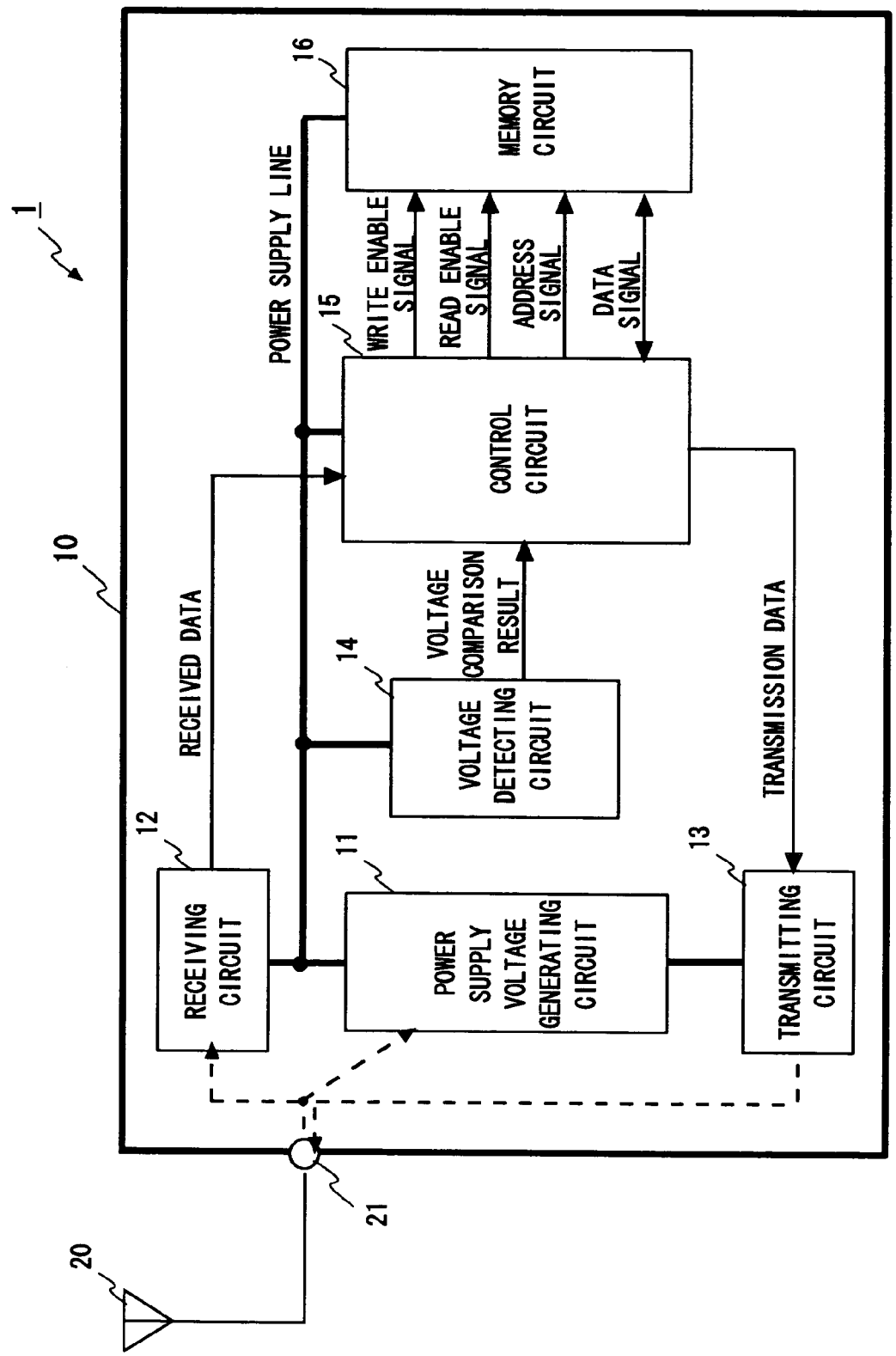
FIG. 2 is a block diagram showing the configuration of the IC tag according to the first embodiment of the present invention.

Referring next to a block diagram of FIG. 2, the configuration of the IC tag according to this embodiment is described. As shown in FIG. 2, the IC tag includes the semiconductor device 10, and an antenna 20. The semiconductor device 10 is connected with the antenna 20 via an antenna terminal 21. Further, the semiconductor device 10 includes the power supply voltage generating circuit 11, a receiving circuit 12, a transmitting circuit 13, a voltage detecting circuit 14, a control circuit 15, and a memory circuit 16.

The antenna 20 transmits/receives radio waves carrying data to/from the reader/writer 2 and thus has characteristics corresponding to a frequency of the radio waves received from the reader/writer 2. The power supply voltage generating circuit 11 rectifies (shapes) radio waves received by the antenna 20 to generate a power supply voltage corresponding to an amplitude of the radio waves. The generated power supply voltage is supplied to the receiving circuit 12 or the transmitting circuit 13, the voltage detecting circuit 14, the control circuit 15, and the memory circuit 16.

The receiving circuit 12 demodulates and converts radio waves received by the antenna 20 into a demodulated signal (received data). The demodulated signal is output to the control circuit 15. The transmitting circuit 13 modulates and converts a data signal generated by the control circuit 15 into a modulated signal. Then, the modulated signal is transmitted in the form of radio waves through the antenna 20 to the reader/writer 2.

The voltage detecting circuit 14 compares a power supply voltage generated by the power supply voltage generating circuit 11 with a predetermined reference voltage, and the voltage comparison result is sent to the control circuit 15. This reference voltage is, for example, a memory read circuit operation marginal voltage value. A detailed description thereof is given below. As an example of the voltage detecting circuit 14, there is an inverter where the memory read circuit operation marginal voltage value is set as a threshold value. For example, a threshold value of the inverter is set to a memory read circuit operation marginal voltage value. An input terminal of the inverter is applied with the power supply voltage generated by the power supply voltage generating circuit 11. If the applied voltage is equal to or lower than the memory read circuit operation marginal voltage value, the inverter outputs "1". On the other hand, if the applied voltage is equal to or higher than the memory read circuit operation marginal voltage value, an output value of the inverter is inverted and the inverter outputs "0". The voltage detecting circuit 14 sends the output value of the inverter as a voltage comparison result to the control circuit 15.

The control circuit 15 is a command executing part for decoding the demodulated signal sent from the receiving circuit 12 to extract and analyze a command, and writing/reading data to/from the memory circuit 16 based on the command. The control circuit 15 of this embodiment executes an operation of reading data from the memory circuit 16 based on the voltage comparison result from the voltage detecting circuit 14 in the case of receiving a read command.

The control circuit 15 turns on/off a write enable signal or read enable signal for controlling operations of reading/writing data from/to the memory circuit 16 based on the received command, inputs an address signal including reading/writing addresses, or inputs/outputs a data signal including reading/writing data.

Further, the control circuit 15 generates a data signal (transmission data) for transmitting data (response data as a result of executing a command) read from the memory circuit 16 to the reader/writer 2. The control circuit 15 outputs the data signal to the transmitting circuit 13. An internal configuration of the control circuit 15 is described below.

The memory circuit 16 is a memory for storing data received from the reader/writer 2, for example, a nonvolatile memory. The memory circuit 16 stores data or outputs stored data under the control of the control circuit 15. For example, the memory circuit 16 can store a tag ID. The memory circuit 16 may be an EEPROM (Electrically Erasable Programmable ROM) as a nonvolatile memory or a flash memory, a FeRAM (Ferroelectric RAM), an MRAM (Magnetic RAM), an OUM (Ovonic Unified Memory), or the like.

Figure 3:
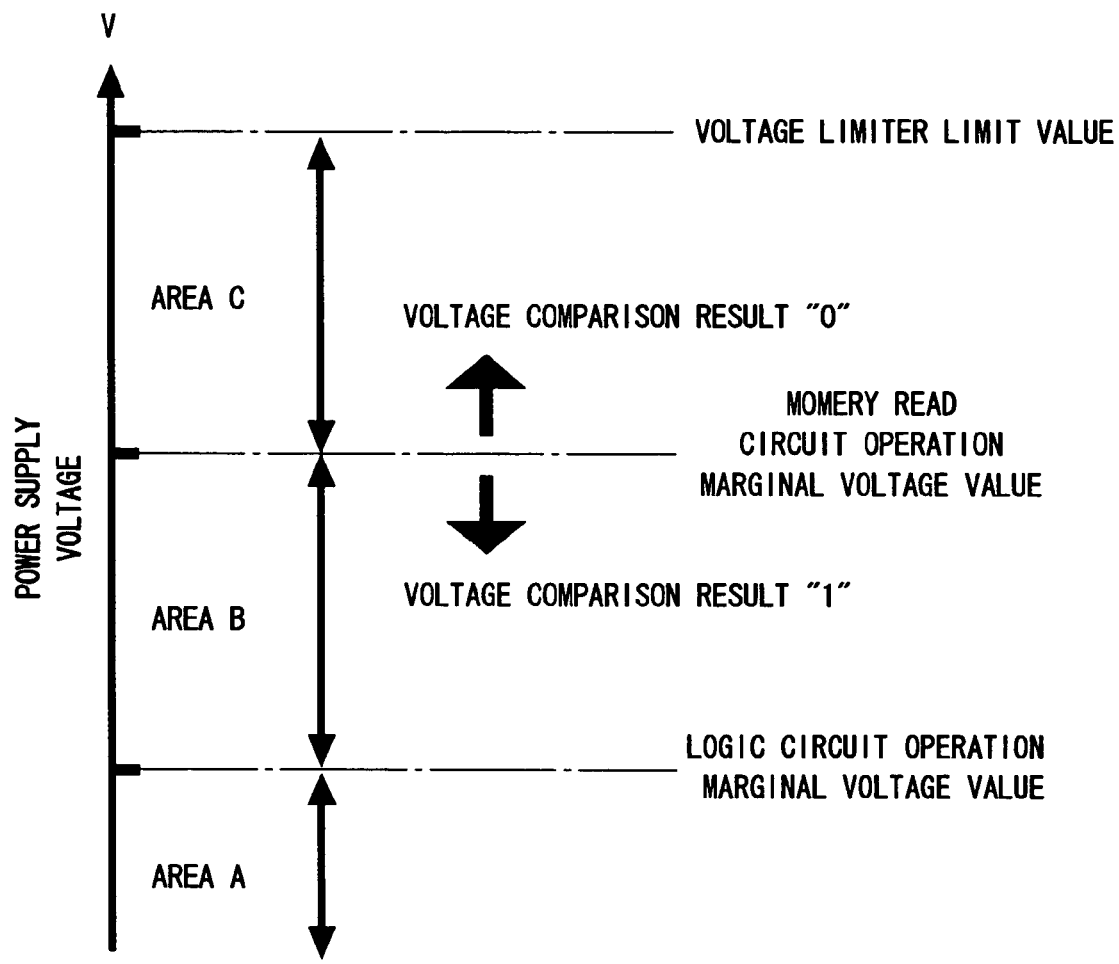
FIG. 3 shows values of a power supply voltage of the IC tag according to the first embodiment of the present invention.

Referring next to FIG. 3, a level of the power supply voltage necessary for operating the IC tag 1 of this embodiment is described. As shown in FIG. 3, in this example, an area is divided into three (areas A to C) depending on a voltage value. The area is classified into the areas A to C corresponding to the logic circuit operation marginal voltage value, the memory read circuit operation marginal voltage value, and a voltage limiter limit value.

A voltage value of the area A is within such a range that the generated power supply voltage value is smaller than the logic circuit operation marginal voltage value. The logic circuit operation marginal voltage value is the lowest possible value of the power supply voltage at which the logic circuit can operate. For example, the logic circuit operation marginal voltage value is about 0.5 V. Therefore, the logic circuit cannot operate at the power supply voltage in the voltage range of the area A. For example, the receiving circuit 12, the transmitting circuit 13, and the control circuit 15 of FIG. 2 are composed of logic circuits and thus cannot operate at this power supply voltage. In other words, if the power supply voltage is lower than the logic circuit operation marginal voltage value, the IC tag 1 cannot execute an operation of receiving data from the reader/writer 2, and operates of transmitting and writing or reading data to or from the reader/writer 2.

A voltage value of the area B is within such a range that the generated power supply voltage ranges from the logic circuit operation marginal voltage value to the memory read circuit operation marginal voltage value. The memory read circuit operation marginal voltage value allows the logic circuit to normally operate, but disallows the logic circuit to normally read data from the nonvolatile memory (memory circuit 16).

In general, a voltage necessary for writing data to the nonvolatile memory is higher than a voltage necessary for reading data (equal to the logic circuit operation marginal voltage value). Unless the reading voltage is a requisite value or higher, a normal writing operation cannot be executed. Hence, the memory circuit 16 of this embodiment incorporates a charge pump circuit (charge pump circuit 51 as described below) for boosting the generated power supply voltage to obtain a voltage necessary for writing data. As mentioned above, a circuit for writing or reading data (reading/writing circuit) is composed of a high-breakdown-voltage element resistance to a high voltage, so an operation voltage (memory read circuit operation marginal voltage value) higher than an operation voltage of the logic circuit is necessary even for the reading operation.

Therefore, the logic circuit can normally operate at a power supply voltage in the voltage range of the area B, but an operation of reading data from the memory circuit 16 cannot be normally executed. That is, if the power supply voltage ranges from the logic circuit operation marginal voltage value to the memory read circuit operation marginal voltage value, the IC tag 1 can receive data from the reader/writer 2, and transmit data to the reader/writer 2, but a data reading operation cannot be performed.

A voltage value of the area C is within such a range that the generated power supply voltage ranges from the memory read circuit operation marginal voltage value to a limit value of a voltage limiter. The voltage limiter limit value means a withstand voltage of a transistor composing a circuit. The power supply voltage in the voltage range of the area C is equal to or higher than the memory read circuit operation marginal voltage value, so an operation of reading data from the memory circuit 16 can be normally performed. That is, if the power supply voltage is equal to or higher than the memory read circuit operation marginal voltage value, the IC tag 1 can normally receive data from the reader/writer 2, transmit the data to the reader/writer 2, and read data. Incidentally, if the power supply voltage is equal to or higher than the limit value of the voltage limiter, the transistors composing the circuit break down.

Figure 4:
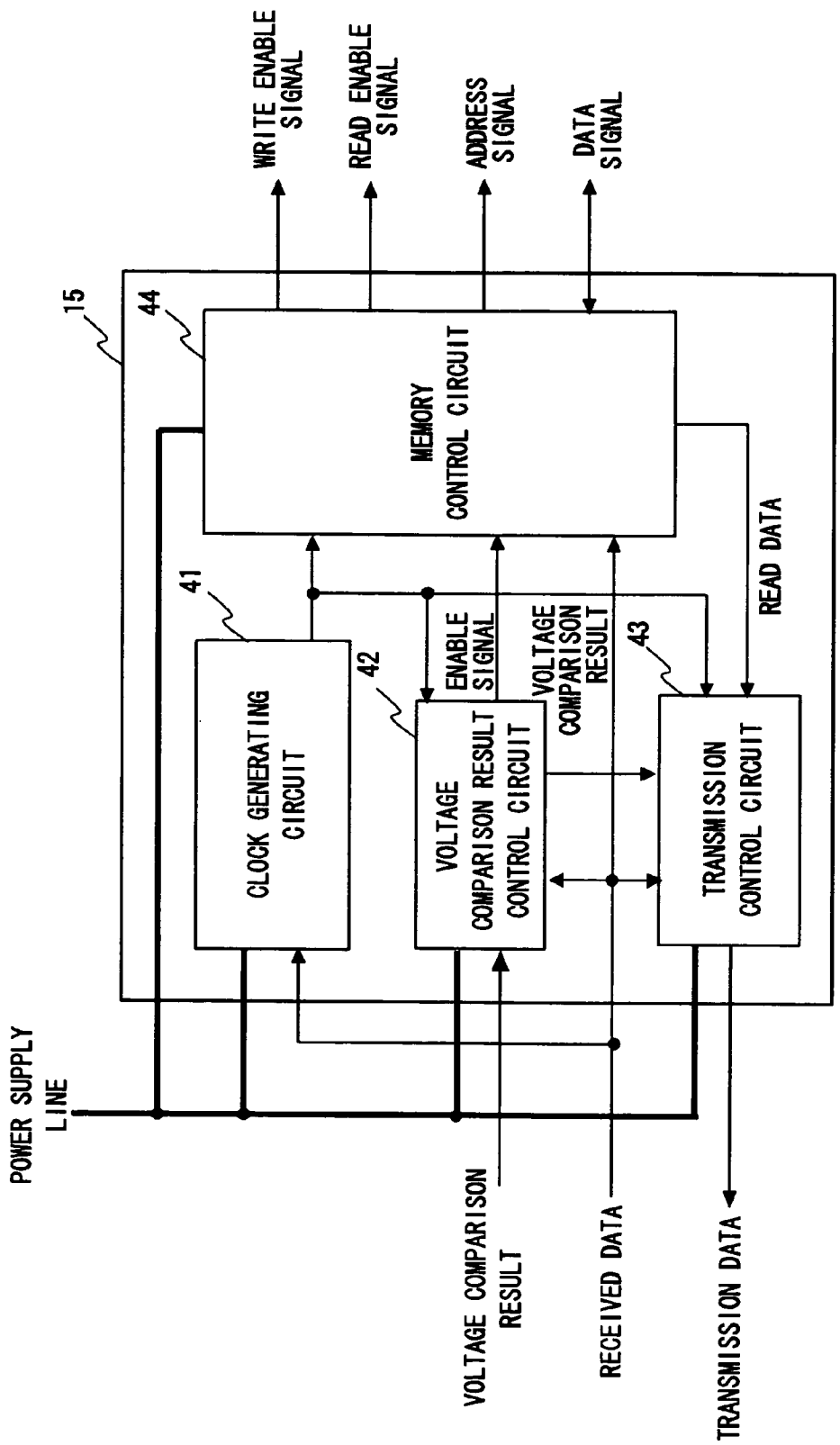
FIG. 4 is a block diagram showing the configuration of a control circuit used in the IC tag according to the first embodiment of the present invention.

FIG. 4 is a block diagram showing the configuration of the control circuit 15 used in the IC tag 1 of this embodiment. As shown in FIG. 4, the control circuit 15 is composed of a clock generating circuit 41, a voltage comparison result control circuit 42, a transmission control circuit 43, and a memory control circuit 44.

The clock generating circuit 41 generates a clock based on a frame pulse having a predetermined frequency in the radio waves from the reader/writer 2 to supply the generated clock to the memory control circuit 44 and other such circuits.

The voltage comparison result control circuit 42 determines whether or not a command from the reader/writer 2 is a read command, and if the command is a read command, outputs an enable signal to the memory control circuit 44 based on the voltage comparison result from the voltage detecting circuit 14. More specifically, if the command is a read command, and the voltage comparison result is "0", a normal reading operation can be executed, so the enable signal is activated (turned on). On the other hand, if the command is a read command, and the voltage comparison result is "1", a normal reading operation cannot be performed, so an enable signal is deactivated (turned off).

The transmission control circuit 43 outputs data read from the reader/writer 2 in response to a read command, or transmission data such as the voltage comparison result from the voltage detecting circuit 14, to the transmitting circuit 13. The memory control circuit 44 receives a command, an address, and data sent from the reader/writer 2 to control a reading or writing operation for the memory circuit 16. However, the reading or writing operation is executed only when the enable signal from the voltage comparison result control circuit 42 is activated. Further, the memory control circuit 44 outputs data that was read in response to the read command to the transmission control circuit 43.

Figure 5:
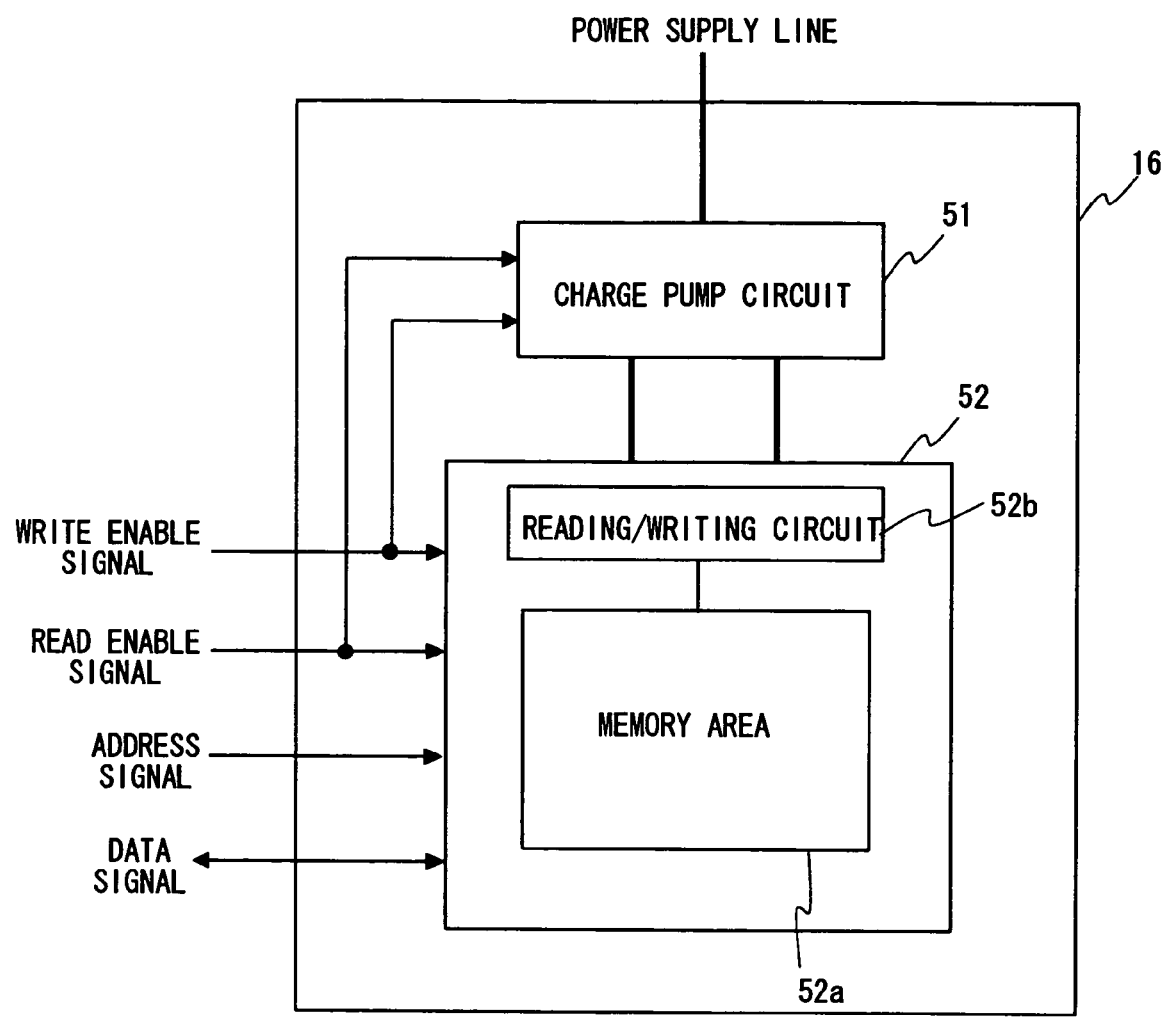
FIG. 5 is a block diagram showing the configuration of a memory circuit used in the IC tag according to the first embodiment of the present invention.

FIG. 5 is a block diagram showing the configuration of the memory circuit 16 used in the IC tag 1 of this embodiment. As shown in FIG. 5, the memory circuit 16 is composed of the charge pump circuit 51 and a memory unit 52. The charge pump circuit 51 boosts the power supply voltage generated by the power supply voltage generating circuit 11 to a voltage level necessary for writing data to the memory unit 52. The data is written to the memory unit 52 using the writing voltage boosted by the charge pump circuit 51 based on a control signal from the control circuit 15. In the case of reading data, the power supply voltage generated by the power supply voltage generating circuit 11 is directly used for the reading operation. Incidentally, a voltage is turned on/off based on the write enable signal and the read enable signal.

Figure 12:
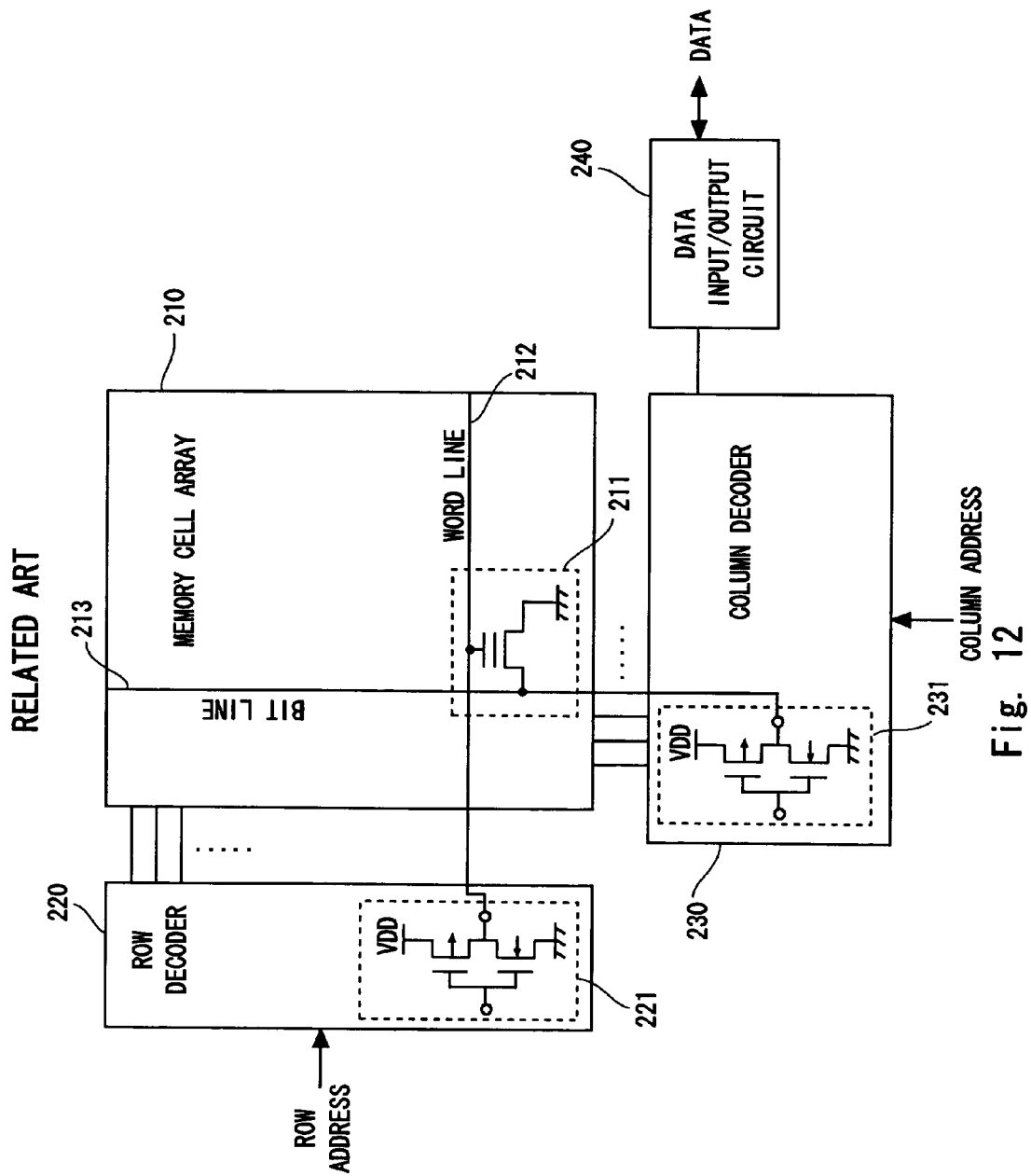
FIG. 12 is a block diagram showing the configuration of a typical nonvolatile memory.

The memory unit 52 is a nonvolatile memory as shown in FIG. 12, for example. That is, the memory unit 52 includes a memory area 52a as a memory cell array and a reading/writing circuit 52b such as a row decoder or a column decoder. In the memory unit 52, the reading/writing circuit 52b is composed of a high-breakdown-voltage element resistance to a high writing voltage as mentioned above, an operation voltage for reading data is higher than an operation voltage of the logic circuit. That is, in the reading/writing circuit 52b, the operation voltage for reading data from the memory area 52a differs from the operation voltage for writing data to the memory area 52a.

Figure 6:
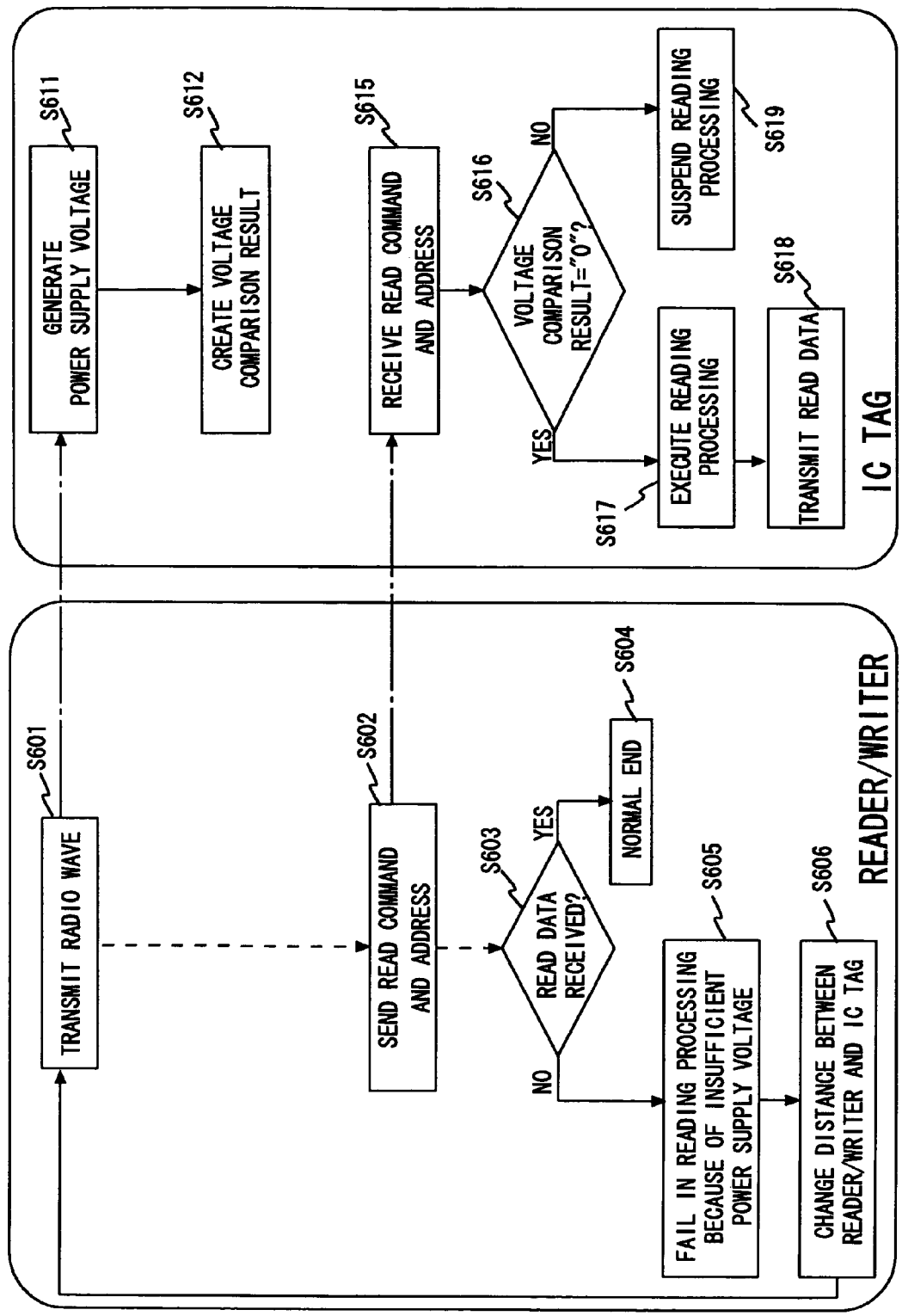
FIG. 6 is a flowchart of a method of reading data from the IC tag according to the first embodiment of the present invention.

Referring next to a flowchart of FIG. 6, a data reading operation in the communication system of this embodiment is described. FIG. 6 shows how the reader/writer 2 reads data from the IC tag 1.

When the reader/writer 2 reads data from the IC tag 1, processings of "transmission of radio waves including only frame pulses (S601)" →"transmission of a read command and a requested address (S602)" are executed to determine whether or not data is normally read based on whether or not there is read data. Hereinafter, a detailed description is given in accordance with a processing flow.

First, the reader/writer 2 transmits radio waves to the IC tag 1 (S601), and the IC tag 1 generates a power supply voltage (S611). The IC tag 1 receives the radio waves including only the frame pulse from the reader/writer 2, and then the power supply voltage generating circuit 11 generates a power supply voltage and also initializes an internal circuit or generates a clock signal with the clock generating circuit 41.

Next, the IC tag 1 creates a voltage comparison result (S612). The voltage detecting circuit 14 of the IC tag 1 determines whether or not the power supply voltage generated by the power supply voltage generating circuit 11 is equal to or higher than the memory read circuit operation marginal voltage value to prepare a voltage comparison result. The voltage detecting circuit 14 generates (outputs) "0" as a voltage comparison result if the power supply voltage is the memory read circuit operation marginal voltage value or higher, and generates (outputs) "1" as a voltage comparison result if the power supply voltage is the memory read circuit operation marginal voltage value or lower.

Next, the reader/writer 2 reads data from the IC tag 1 after the elapse of a predetermined period. The reader/writer 2 sends a read command and a required address to the IC tag 1 (S602), and the IC tag 1 receives the read command and the required address (S615).

Next, the IC tag 1 determines the voltage comparison result (S616). If it is determined that a read command is received, the voltage comparison result control circuit 42 of the IC tag 1 references the voltage comparison result from the voltage detecting circuit 14 to determine whether or not the voltage comparison result is "0".

If the comparison result is "0" in step S616, the IC tag 1 executes a reading operation (S617). If the comparison result from the voltage detecting circuit 14 is "0", the voltage comparison result control circuit 42 of the IC tag 1 activates an enable signal to allow the reading operation for the memory circuit 16. The memory control circuit 44 controls a read enable signal and address signal necessary for reading data from the memory unit 52 to read data stored at the address designated by the reader/writer 2.

Next, the IC tag 1 transmits the read data to the reader/writer 2 (S618). The IC tag 1 sends data read by the memory control circuit 44 to the reader/writer 2 via the transmission control circuit 43 by the transmitting circuit 13.

Further, if the voltage comparison result is "1" in S616, the IC tag stops a reading operation (S619). That is, the IC tag 1 does not execute data transmission. IF the voltage comparison result from the voltage detecting circuit 14 is "1", the voltage comparison result control circuit 42 of the IC tag 1 deactivates an enable signal not to allow the reading operation for the memory circuit 16. Since the enable signal is deactivated, the memory control circuit 44 executes neither the reading operation nor the data transmission to the reader/writer 2.

Next, the reader/writer 2 determines whether or not the read data has been received from the IC tag 1 within a predetermined period from the transmission of the read command (S602) (S603). If the read data has been received from the IC tag 1 within a predetermined period in S603, the reader/writer 2 determines that the reading operation is normally executed to normally end the reading operation (S604).

Further, if the read data has not been received from the IC tag 1 within a predetermined period in S603, the reader/writer 2 determines that the reading operation for the IC tag 1 ends in failure due to the shortage of generated power supply voltage (S605). Next, after the distance between the reader/writer 2 and the IC tag 1 is changed (S606), the reader/writer 2 re-executes the reading operation from step S601.

In this way, data is read only when the power supply voltage of the IC tag reaches a voltage that allows a normal data reading operation, whereby the reading operation for the IC tag can be reliably executed. If the power supply voltage is a predetermined voltage level or lower, the data reading operation is not performed to make no response to the reader/writer, making it possible to prevent the IC tag from transmitting wrong read data to the reader/writer. Hence, it is ensured that the read data to be transmitted from the IC tag to the reader/writer is correct data to improve a reliability of read data. Accordingly, it is possible to prevent data from being erroneously processed. An erroneous operation can be prevented.

Further, the reader/writer determines that the reading operation ends in failure because of the shortage of the power supply voltage based on the fact that a response from the IC tag has not been sent during a predetermined period. Hence, it is possible to take a measure for making up for the shortage of the power supply voltage such as reducing a distance between the reader/writer and the IC tag. Thus, it is possible to avoid such a situation that the re-reading operation ends in failure for the same reason.

Second Embodiment

Next, a communication system using an IC tag according to a second embodiment is described. The IC tag and the communication system of this embodiment have a feature that a temporary storage circuit other than the memory circuit is provided to the IC tag. Incidentally, the communication system of this embodiment has the same configuration as that of FIG. 1, so its description is omitted. Then, the configuration of the IC tag is described.

Figure 7:
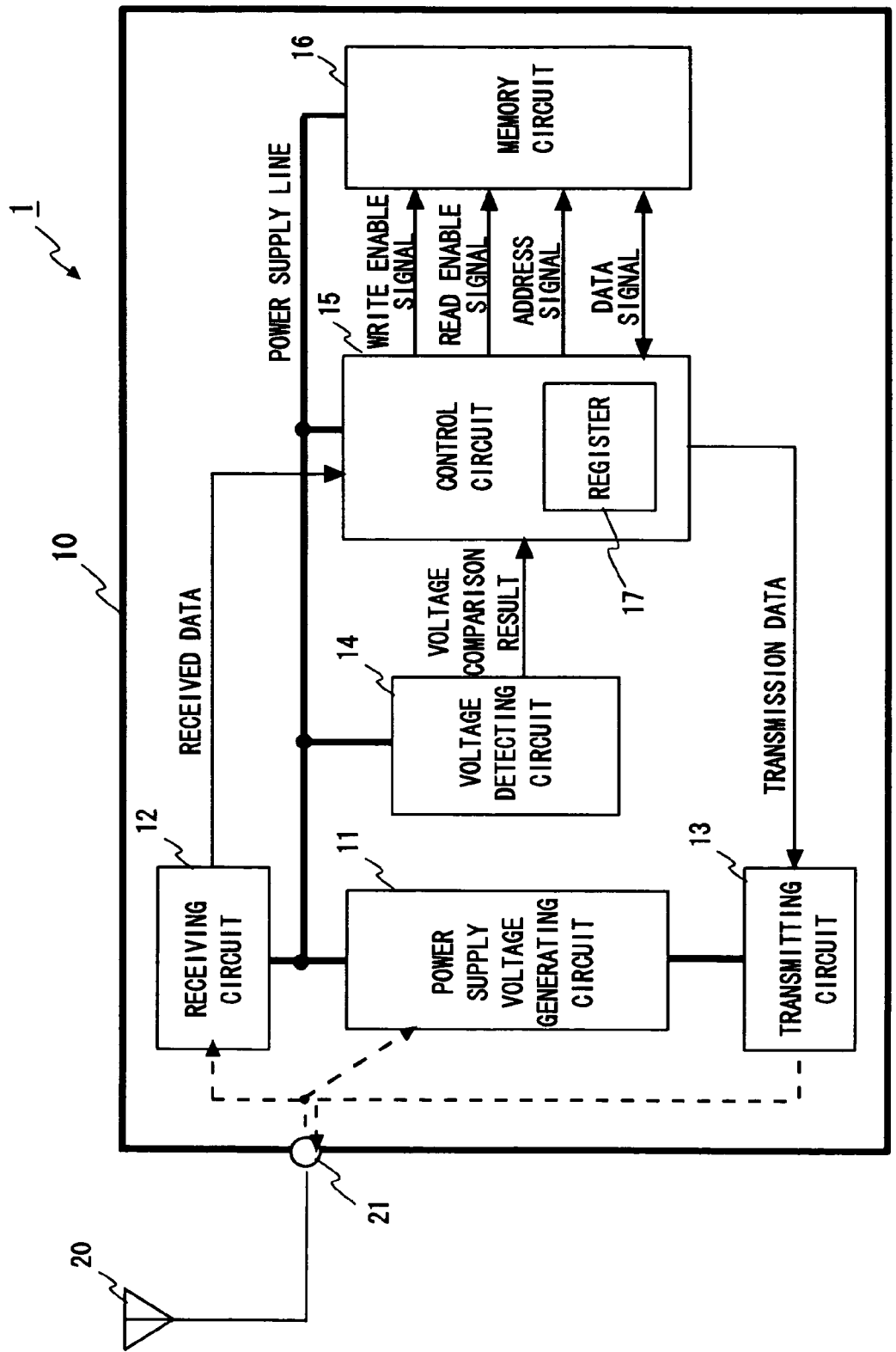
FIG. 7 is a block diagram showing the configuration of an IC tag according to a second embodiment of the present invention.

FIG. 7 is a block diagram showing the configuration of the IC tag according to this embodiment. In FIG. 7, the same components as those of FIG. 2 are denoted by like reference numerals, and their description is omitted. The IC tag 1 has a register 17 in the control circuit 15 in addition to the components of FIG. 2. Other components of the control circuit 15 are the same as those of FIG. 4, and the configuration of the memory circuit 16 is the same as that of FIG. 5.

The register 17 is an example of a temporary storage circuit. For example, the register 17 temporarily stores a voltage comparison result from the voltage detecting circuit 14. Further, the register 17 stores plural voltage comparison results as well as other information.

When data is read from the memory circuit 16, a reading operation should be controlled. For example, the read enable signal or address signal needs to be turned on/off. In the case of reading data from the register 17, such reading operation control is unnecessary, nor does the reading/writing circuit 52b of the memory unit 52 operate. Further, the register 17 is composed of the same logic circuits (transistors) as the transistors in the control circuit 15. Accordingly, if the power supply voltage of the IC tag 1 is a voltage that allows the logic circuits to operate, that is, falls within a voltage range of the area B (logic circuit operation marginal voltage value to memory read circuit operation marginal voltage value), the data in the register 17 can be acquired. The use of the register 17 enables power saving and high-speed reading.

Figure 8:
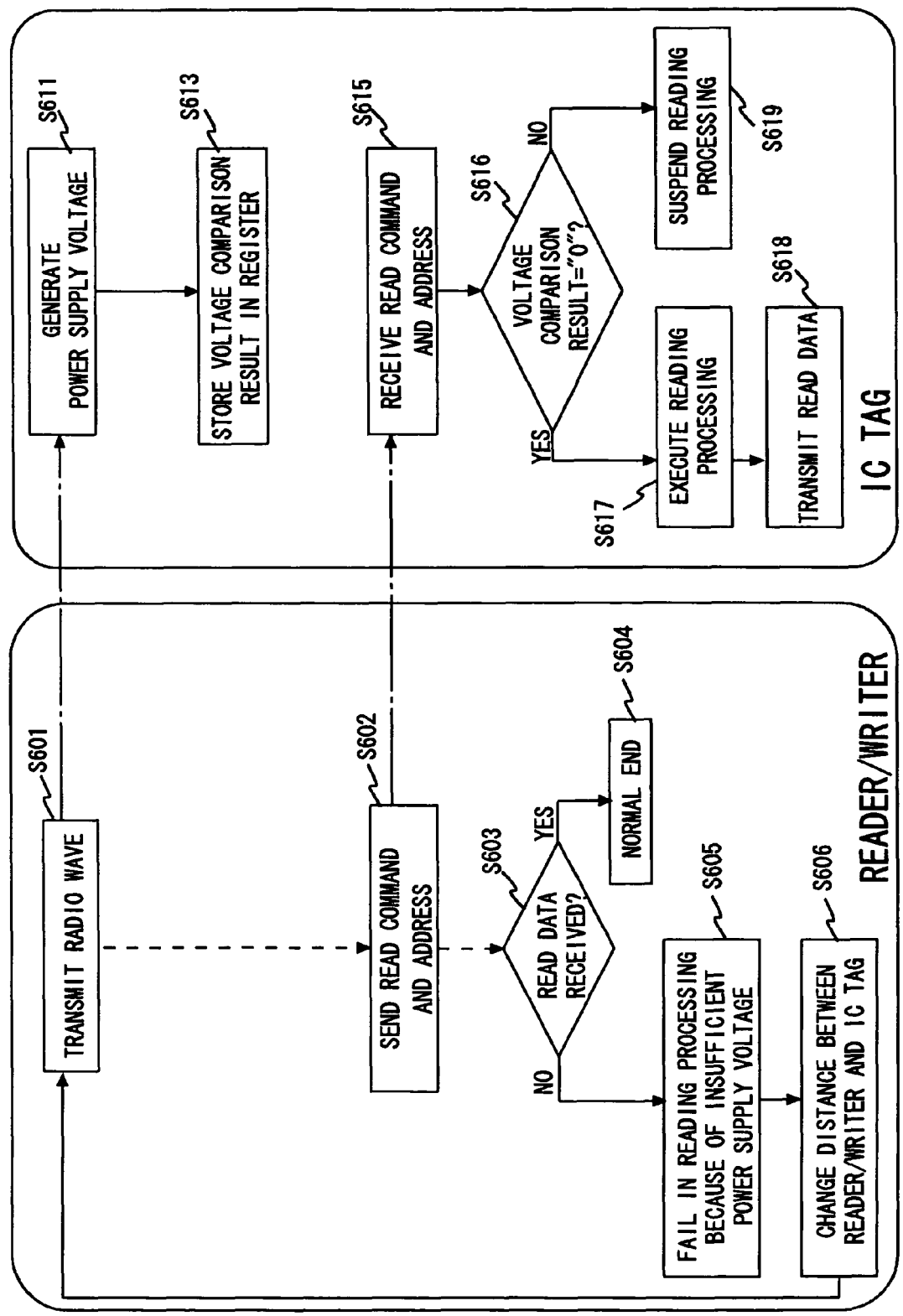
FIG. 8 is a flowchart of a method of reading data from the IC tag according to the second embodiment of the present invention.

Referring next to a flowchart of FIG. 8, the data reading operation in the communication system of this embodiment is described. FIG. 8 shows how the reader/writer 2 reads data from the IC tag 1. In FIG. 8, the same steps as those of FIG. 6 are denoted by like reference symbols, and their description is omitted.

In this embodiment, unlike the steps of FIG. 6, the reader/writer 2 transmits radio waves (S601), and after the power supply voltage is generated in the IC tag 1 (S611), the voltage comparison result is stored in the register 17 (S613). The register 17 temporarily stores the voltage comparison result from the IC tag 1 of the voltage detecting circuit 14. Next, the reader/writer 2 sends a read command and a required address (S602), and after the read command is received in the IC tag 1 (S615), the voltage comparison result is evaluated (S616). At this time, the voltage comparison result stored in the register 17 is acquired and evaluated. Then, based on a value of the register 17, the reading operation is executed (S617), and the read data is transmitted (S618). Alternatively, the reading operation is stopped (S619). The reader/writer 2 normally ends the reading operation based on the determination of the received read data (S603) (S604). Alternatively, the reader/writer determines that the reading operation ends in failure (S605), and a distance between the reader/writer 2 and the IC tag 1 is changed (S606).

In this way, the voltage comparison result is stored in a temporary storage circuit of the IC tag, whereby the voltage comparison result at a given time point can be used. As shown in FIG. 8, based on the voltage comparison result in the register, it is controlled whether or not the reading operation is performed for the IC tag. Further, the voltage comparison result stored in the register is sent to the reader/writer together with read data without being evaluated in the IC tag, and in the reader/writer, the read data can be processed based on the voltage comparison result. For example, data to be transmitted from the IC tag to the reader/writer includes a CRC (Cyclic Redundancy Check) bit for checking a communication error. The CRC bit is checked on the reader/writer side to ensure a reliability of communication data. The CRC bit is further added to the voltage comparison result at the time of reading operation, and the IC tag sends the bit to the reader/writer, making it possible to check a communication error and check a normality of a reading operation. Hence, the reliability of the read data can be further improved.

For example, the register can store voltage comparison results after the elapse of various periods from the generation of the power supply voltage in the IC tag, together with each time as history information. In particular, the IC tag 1 generates the power supply voltage by radio waves, so the power supply voltage is easily influenced by a change in environments surrounding the reader/writer 2 and the IC tag 1. Accordingly, the voltage comparison results at various times are stored as the history information, so the voltage comparison results can be effectively used to enable an operation suitable for the system environment. For example, in a system where the IC tag is transferred on a belt conveyor, if the history information stored in the register is prestored in the reader/writer, the IC tag reading operation can be efficiently performed based on the history information in a subsequent step. In particular, in the case where the IC tag is transferred at high speeds, the reading operation should be performed at higher speeds, and a read command is executed at a suitable point based on the history information to allow an accurate processing.

Third Embodiment

Next, a communication system using an IC tag according to a third embodiment of the present invention is described. The IC tag and the communication system of this embodiment have a feature that a reader/writer obtains voltage comparison results as results of evaluating the power supply voltage in the IC tag. Incidentally, the communication system of this embodiment has the same configuration as that of FIG. 1, and the IC tag has the same configuration as that of FIG. 7, so their description is omitted, and the following description is focused on an operation of the communication system.

Figure 9:
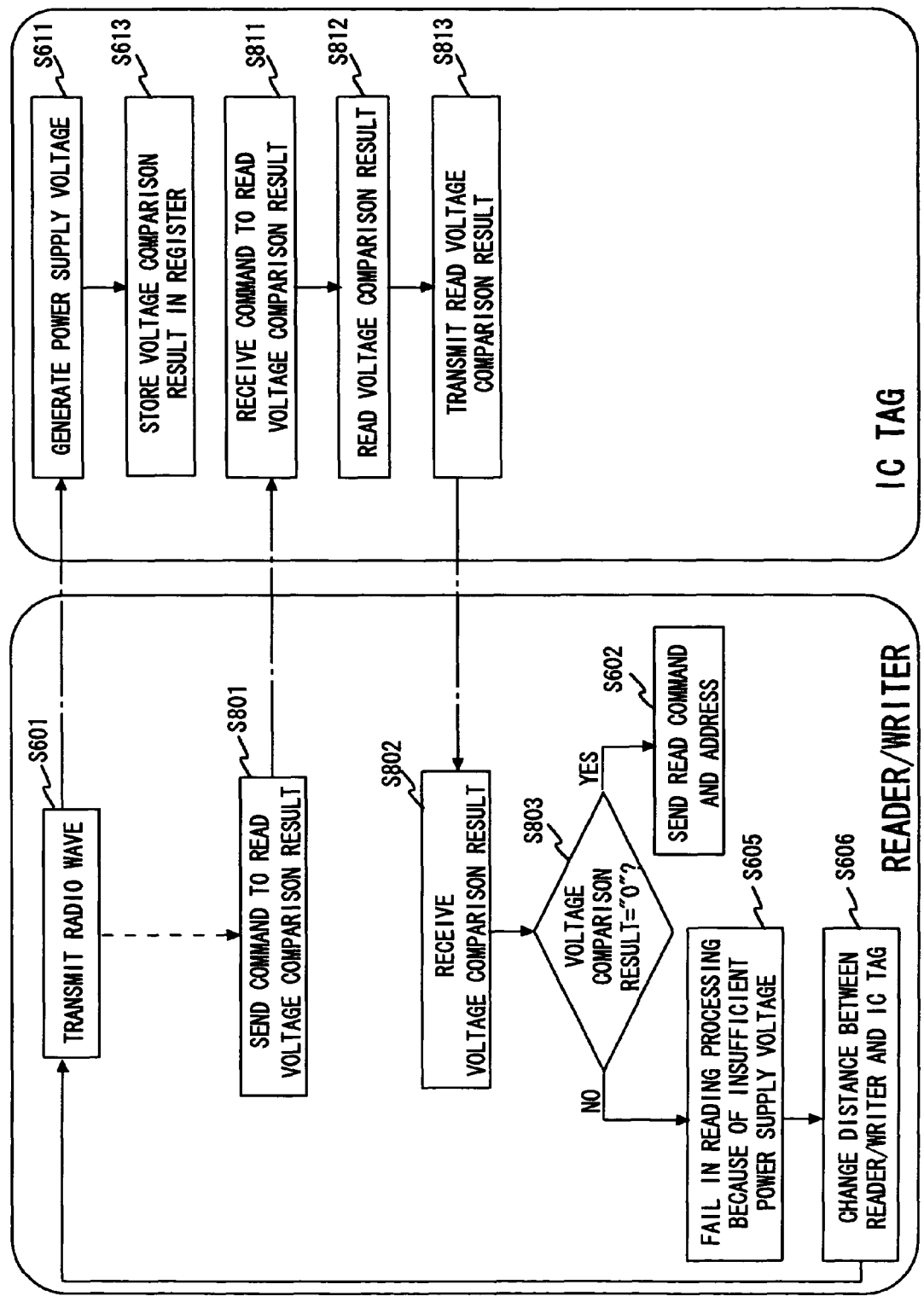
FIG. 9 is a flowchart of a method of reading data from an IC tag according to a third embodiment of the present invention.

FIG. 9 is a flowchart of a data reading operation in the communication system of this embodiment. In FIG. 9, the same steps as those of FIGS. 6 and 8 are denoted by like reference symbols, and their description is omitted.

FIG. 9 shows an example where data is read based on a voltage comparison result sent to the reader/writer 2 from the IC tag 1. As shown in FIG. 9, first, radio waves are transmitted from the reader/writer 2 (S601), and the IC tag 1 generates a power supply voltage (S611), after which the voltage comparison result is stored in the register 17 (S613). Next, the reader/writer 2 sends a command to read a voltage comparison result to the IC tag 1 prior to the transmission of the read command (S801). The IC tag 1 receives the command to read the voltage comparison result (S811), and reads the voltage comparison result stored in the register 17 (S812), and then transmits the read voltage comparison result to the reader/writer 2 (S813). Next, the reader/writer 2 receives the voltage comparison result (S802) to determine whether or not the voltage comparison result is "0" (S803).

If the voltage comparison result is "0" in S803, the reader/writer 2 determines that the power supply voltage is equal to or higher than the memory read circuit operation marginal voltage value, and the normal reading operation can be performed, and sends a read command and a requested address to the IC tag 1 (S602) Further, if the voltage comparison result is not "0" in S803, the reader/writer 2 determines that the power supply voltage is lower than the memory read circuit operation marginal voltage value, and the normal reading operation cannot be performed because of the shortage of the generated power supply voltage (S605) In this case, the power supply voltage generating circuit 11 should generate a higher power supply voltage, so a distance between the reader/writer 2 and the IC tag 1 is changed (S606), and thus radio waves not carrying data are transmitted again prior to the transmission of the read command (S601).

As mentioned above, prior to the transmission of the read command from the reader/writer, the voltage comparison result is previously obtained from the IC tag, whereby the shortage of the power supply voltage generated by the IC tag can be detected, and needless transmission of a read command from the reader/writer can be prevented. Further, when the distance between the reader/writer 2 and the IC tag 1 is changed to increase the power supply voltage of the IC tag to a sufficient level, a read command is sent to reliably execute a reading operation. Further, the voltage comparison result stored in the register of the IC tag is read, so a reading operation can be performed with lower power consumption at higher speeds than the case of reading data from a memory circuit of the IC tag. In other words, the register is used to read the voltage comparison result as long as the distance between the IC tag and the reader/writer is within such a range that a voltage necessary for operating logic circuits can be generated.

Fourth Embodiment

Next, a communication system using an IC tag according to a fourth embodiment of the present invention is described. The IC tag and the communication system of this embodiment have a feature that a voltage comparison result and a tag ID are stored in a temporary storage area of the IC tag. Incidentally, in the communication system according to this embodiment has the same configuration as that of FIG. 1, and the configuration of the IC tag is the same as that of FIG. 7, so their description is omitted. In this embodiment, a tag ID is stored in the register 17 of the IC tag 1.

Figure 10:
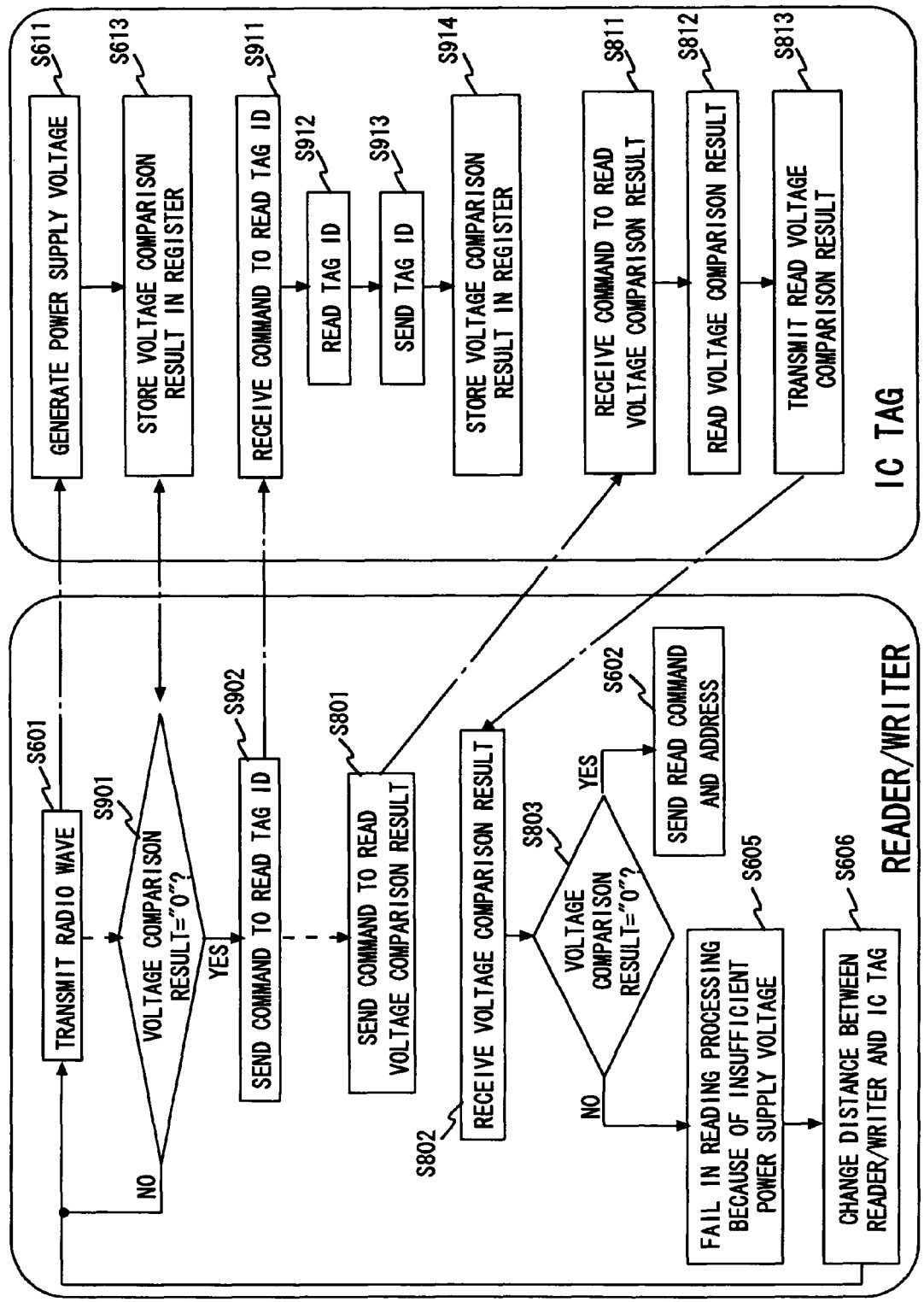
FIG. 10 is a flowchart of a method of reading data from an IC tag according to a fourth embodiment of the present invention.
Figure 11:
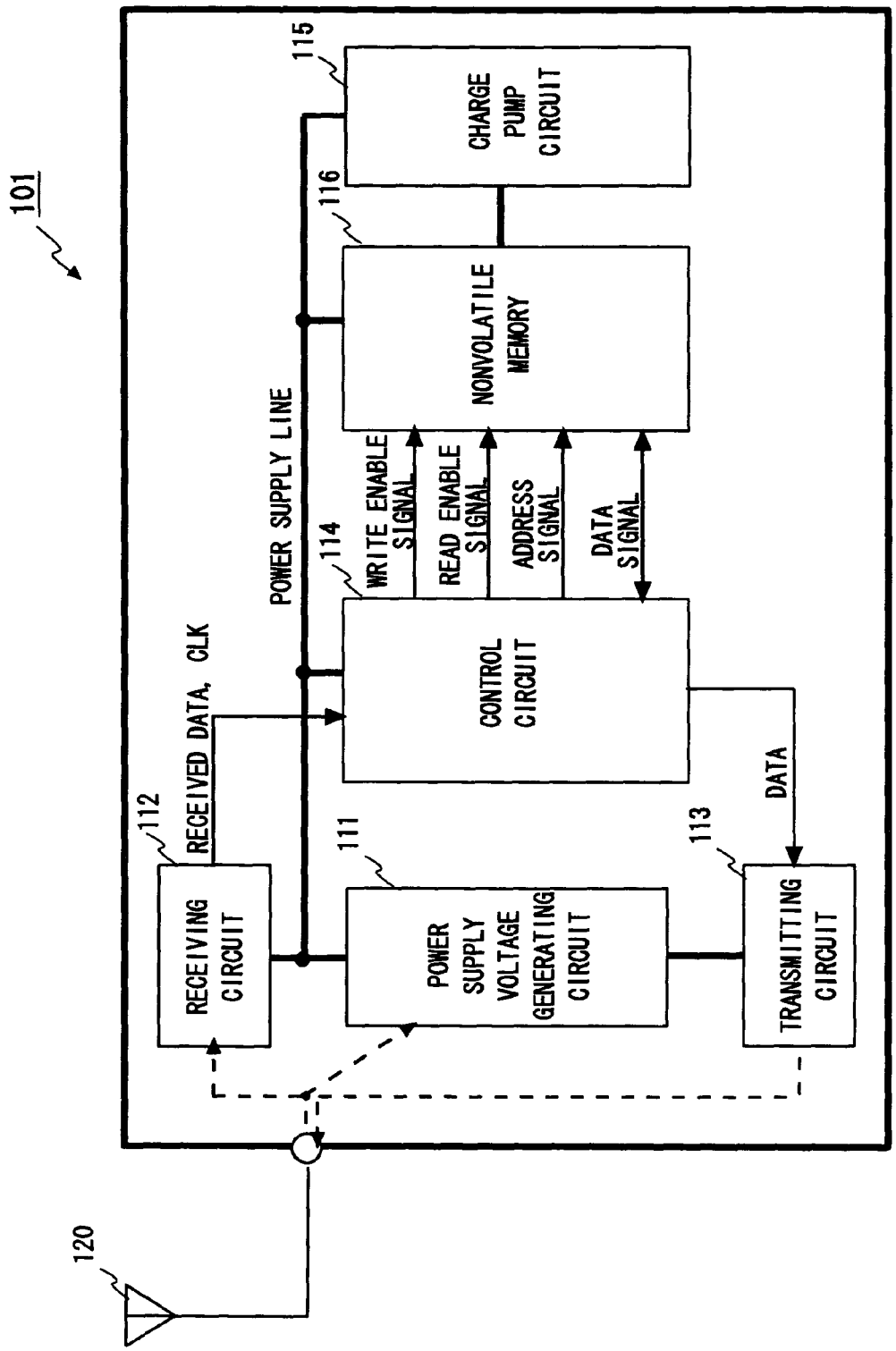
FIG. 11 is a block diagram showing the configuration of a conventional IC tag.

FIG. 10 is a flowchart of a data reading operation in a communication system of this embodiment. In FIG. 10, the same steps as those of FIGS. 6, 8, and 9 are denoted by like reference symbols, and their description is omitted.

FIG. 10 shows an example where the reader/writer 2 reads a tag ID from the IC tag 1 prior to the reading operation of FIG. 9. As shown in FIG. 10, first, the reader/writer 2 transmits radio waves (S601), and in the IC tag 1, the power supply voltage is generated (S611), after which the voltage comparison result is stored in the register 17 (S613). In S613, the tag ID is read from the memory circuit 16 and stored in a register. For example, if a power supply voltage generated by the power supply voltage generating circuit 11 is equal to or higher than an operation voltage of the logic circuits, a reset signal is sent from the power supply voltage generating circuit 11 to the control circuit 15. The control circuit 15 receives the reset signal and then reads a tag ID from the memory circuit 16 and stores the ID in the register 17.

The reader/writer 2 acquires and evaluates a voltage comparison result in response to a command to read a voltage comparison result (S901). If the voltage comparison result is "0" in S901, the reader/writer 2 determines that the power supply voltage is equal to or higher than the memory read circuit operation marginal voltage value, and the normal reading operation can be performed, and thus sends a tag ID read command to the IC tag 1 (S902). Further, if the voltage comparison result is not "0" in S901, the reader/writer 2 determines that the power supply voltage is lower than the memory read circuit operation marginal voltage value, and a normal reading operation cannot be performed because of the shortage of generated power supply voltage, and thus transmits radio waves again (S601).

Next, the IC tag 1 receives a tag ID read command (S911), and then reads a tag ID stored in the register 17 (S912) to transmit the tag ID to the reader/writer 2 (S913), after which a voltage comparison result is stored in the register 17 (S914). After that, similar to steps S801 to S803, S811 to S813, S602, S605, and S606 of FIG. 9, the reader/writer 2 acquires a voltage comparison result in response to a command to read the voltage comparison result, and the read command is transmitted or the distance is changed based on the voltage comparison result.

In this way, a tag ID is stored in the register of the IC tag and then read from the reader/writer, whereby a reading operation can be performed with lower power consumption at higher speeds than the case of reading a tag ID from the memory circuit of the IC tag. For example, when read data is transmitted from the memory circuit 16 of the IC tag, the control circuit 15 reads data, and a transmission processing is executed while read data is accumulated in a transmission buffer. If the data length of the tag ID exceeds a size of the transmission buffer, the data is read and the read data is stored in the transmission buffer plural times. As in this embodiment, the use of a register makes these processings unnecessary, so the tag ID can be directly transmitted from the register, and a high-speed reading operation can be performed.

Further, the reader/writer reads a tag ID of the IC tag based on the voltage comparison result to prevent useless transmission of a tag ID read command and to reliably execute a tag ID reading operation. The voltage comparison result only requires 1 bit in contrast to a bit sequence of the tag ID (for example, 128 bits), so a reading operation can be performed at higher speeds. For example, if there are plural IC tags in the communication system, an anti-collision processing is necessary. In the anti-collision processing, tag IDs are read from the plural IC tags, and a predetermined tag is identified as a communication target. In some cases, a tag ID reading operation is carries out for all IC tags. Hence, the tag ID reading operation is performed at higher speeds, whereby a time period necessary for the anti-collision processing can be considerably reduced.

Incidentally, in this embodiment, a voltage comparison result or a tag ID is stored in a register without limitations, but the information may be stored in the register in response to a command from the reader/writer. For example, a command to read predetermined data from the memory circuit to the register is sent from the reader/writer to the IC tag, and the IC tag stores the data in the register. If the read data is stored in the register in advance, the read data can be read at higher speeds.

Other Embodiments

In the above embodiments, one reference voltage (memory read circuit operation marginal voltage value) for evaluating the power supply voltage is set to control a reading operation. However, the present invention is not limited thereto, and more reference voltage values may be used for the evaluation. For example, the voltage may be compared with the plural reference voltage values to control operations of memory circuits or other circuits different in operation voltage.

In the above example, as a method of notifying the reader/writer that the power supply voltage of the IC tag is a reference voltage or lower, the method of stopping transmission from the IC tag to the reader/writer or the method of transmitting the voltage comparison result are described. However, the present invention is not limited thereto but may adopt other methods. For example, a modulation degree is intentionally changed to disallow the reader/writer to receive data. Further, if the power supply voltage is detected prior to the reception of the read command from the reader/writer, the reception of the receiving circuit may be disabled.

The above embodiments describe the IC tag including a memory to/from which data can be written/read. However, the present invention is not limited thereto but may be an IC tag including a memory mainly for reading data. For example, even an IC tag designated for a reading operation such as an alternative to a barcode allows an accurate reading operation as long as configured such that an operation voltage for the logic circuit differs from an operation voltage for reading data.

It is apparent that the present invention is not limited to the above embodiment that may be modified and changed without departing from the scope and spirit of the invention.

What is claimed is:

1. A passive type radio frequency identification (RFID) semiconductor device that communicates with a reader/writer by using a radio signal, the passive type RFID semiconductor device comprising:

a power supply voltage generator that is responsive to a radio signal to generate a power supply voltage therefrom;

a storage unit that stores predetermined data;

a voltage detector that monitors a voltage level of the power supply voltage generated by the power supply voltage generator, a control unit that can execute a read command included in the radio signal to generate a read signal and transmission data, if the voltage level of the power supply voltage is at least a first voltage value;

a memory access unit that is coupled to the storage unit and that can read the predetermined data from the storage unit in response to the read signal, if the voltage level of the power supply voltage is at least a second voltage value; and a transmitter that is coupled to the control unit and that outputs the transmission data, wherein the second voltage value is larger than the first voltage value, and wherein the transmitter does not output the transmission data when the voltage level of the power supply voltage monitored by the voltage detector is at least the first voltage value but less than the second voltage value.

2. The passive type RFID semiconductor device according to claim 1, wherein the control unit does not generate the read signal when the voltage level of the power supply voltage monitored by the voltage detector is at least the first voltage value but less than the second voltage value.

3. The passive type RFID semiconductor device according to claim 2, wherein the control unit generates the read signal when the voltage level of the power supply voltage monitored by the voltage detector is at least the second voltage value, if the read command is present in the radio signal.

4. The passive type RFID semiconductor device according to claim 1, wherein the control unit does not generate the transmission data when the voltage level of the power supply voltage monitored by the voltage detector is at least the first voltage value but less than the second voltage value.

5. The passive type RFID semiconductor device according to claim 4, wherein the control unit generates the transmission data when the voltage level of the power supply voltage monitored by the voltage detector is larger than the second voltage value, if the read command is present in the radio signal.

6. The passive type RFID semiconductor device according to claim 1, wherein the voltage detector generates a detection information of when the voltage level of the power supply voltage is at least the second voltage value, and wherein the control unit comprises a memory that is coupled to the voltage detector and that stores the detection information.

7. The passive type RFID semiconductor device according to claim 6, wherein the control unit comprises a memory that is coupled to the nonvolatile memory and that stores a tag ID outputted from the nonvolatile memory.

8. The passive type RFID semiconductor device according to claim 1, wherein the voltage detector generates a detection information of when the voltage level of the power supply voltage is at least the first voltage value but less than the second voltage value, and wherein the control unit comprises a memory that is coupled to the voltage detector and that stores the detection information.

9. The passive type RFID semiconductor device according to claim 8, wherein the transmitter outputs the detection information stored in the memory when the voltage level of the power supply voltage is at least the first voltage value but less than the second voltage level.

10. The passive type RFID semiconductor device according to claim 1, wherein the storage unit comprises a nonvolatile memory.

11. The passive type RFID semiconductor device according to claim 1, further comprising a receiver that is coupled to the control unit and that demodulates data included in the radio signal.

12. The passive type RFID semiconductor device according to claim 1, wherein the transmitter outputs the transmission data when the voltage level of the power supply voltage monitored by the voltage detector is at least the second voltage value, if the read command is present in the radio signal.

13. The passive type RFID semiconductor device according to claim 1, wherein the transmitter is operable only when the voltage level of the power supply voltage is at least the first voltage value.

14. An integrated circuit (IC) tag, comprising:
the passive type RFID semiconductor device according to claim 1; and
an antenna that is configured for transmitting a radio signal including the transmission data to the reader/writer and for receiving a radio signal including a command from the reader/writer.

15. The IC tag according to claim 14, wherein the antenna is coupled to the power supply generator and the transmitter.

16. The IC tag according to claim 15,
wherein the passive type RFID semiconductor device further comprises a receiver that is coupled to the control unit and that demodulates data included in the radio signal, and
wherein the antenna is further coupled to the receiver.

17. The passive type RFID semiconductor device according to claim 1, wherein
the first voltage level comprises a minimum voltage value at which a logic circuit can operate, and
the second voltage level comprises a minimum voltage value at which data can be read from the storage unit.

18. The passive type RFID semiconductor device according to claim 1, wherein
the transmission data comprises data to be transmitted to the reader/writer in response to the read command.

19. A control method for an integrated circuit (IC) tag that communicates with a reader/writer by using a radio signal, the control method comprising:
receiving a read command included in the radio signal from the reader/writer;
generating a power supply voltage of at least a first voltage value, based on the radio signal;
executing the read command to generate a read signal and transmission data, if a voltage level of the power supply voltage is at least the first voltage value;
detecting whether the voltage level of the power supply voltage is less than a second voltage value;
reading a predetermined data from a storage unit of the IC tag in response to the read signal, if the voltage level of the power supply voltage is at least the second voltage value; and
outputting the transmission data,
wherein the second voltage value is larger than the first voltage value, and
wherein the transmission data is not outputted when the detected voltage level of the power supply voltage is at least the first voltage value but less than the second voltage value.

20. The control method according to claim 19, wherein the read signal is not generated when the detected voltage level of the power supply voltage is at least the first voltage value but less than the second voltage value.

21. The control method according to claim 19, wherein the transmission data is not generated when the detected voltage level of the power supply voltage is at least the first voltage value but less than the second voltage value.

22. The control method according to claim 19, further comprising outputting a detection result of the detecting to the reader/writer.

23. A communication method for a communication between an integrated circuit (IC) tag and a reader/writer by using a radio signal, the communication method comprising:
in the reader/writer, transmitting a read command included in the radio signal; and
in the IC tag:
receiving the read command included in the radio signal;
generating a power supply voltage of at least a first voltage value, based on the received radio signal;
executing the read command to generate a read signal and transmission data, if a voltage level of the power supply voltage is at least the first voltage value;
detecting whether the voltage level of the power supply voltage is less than a second voltage value;
reading a predetermined data from a storage unit of the IC tag in response to the read signal, if the voltage level of the power supply voltage is at least the second voltage value; and
outputting the transmission data,
wherein the second voltage value is larger than the first voltage value, and
wherein the transmission data is not outputted when the detected voltage level of the power supply voltage is at least the first voltage value but less than the second voltage value.

24. The communication method according to claim 23, further comprising:
in the reader/writer:
determining that a reading operation regarding the read command ends in failure, if the reader/writer does not receive the transmission data corresponding to the read command within a predetermined time period after the reader/writer outputs the read command included in the radio signal; and
adjusting a position of the reader/writer if the reading operation ends in failure.

* * * * *